United States Patent
Singer et al.

(10) Patent No.: US 7,490,487 B2
(45) Date of Patent: Feb. 17, 2009

(54) REFINING CHAMBER MADE OF PLATINUM GROUP METAL MATERIALS

(75) Inventors: Rudolf Singer, Engelstadt (DE); Hubertus Gölitzer, Alzenau (DE)

(73) Assignees: Umicore AG & Co. KG, Hanau-Wolfgang (DE); Asahi Glass Company, Limited, Tokyo (JP)

( * ) Notice: Subject to any disclaimer, the term of this patent is extended or adjusted under 35 U.S.C. 154(b) by 465 days.

(21) Appl. No.: 10/532,270

(22) PCT Filed: Oct. 23, 2003

(86) PCT No.: PCT/EP03/11738

§ 371 (c)(1),
(2), (4) Date: Oct. 31, 2005

(87) PCT Pub. No.: WO2004/037733

PCT Pub. Date: May 6, 2004

(65) Prior Publication Data

US 2006/0096322 A1 May 11, 2006

(30) Foreign Application Priority Data

Oct. 25, 2002 (DE) ............................... 102 49 862

(51) Int. Cl.
 *C03B 5/225* (2006.01)
 *C03B 5/20* (2006.01)
(52) U.S. Cl. ................. 65/346; 65/134.1; 65/134.2; 65/134.9; 65/135.1; 65/374.12; 72/370.19
(58) Field of Classification Search ............. 65/134.1, 65/134.2, 134.9, 374.11, 374.12, 346, 347, 65/135.3, 157, 135.1; 75/508, 512; 72/58, 72/59, 370.19; 95/242, 266; 96/176, 193
See application file for complete search history.

(56) References Cited

U.S. PATENT DOCUMENTS

| 2,750,161 A | * | 6/1956 | Simmons .................. 65/135.3 |
| 6,308,534 B1 | * | 10/2001 | Takei et al. .................. 65/347 |
| 2002/0046586 A1 | | 4/2002 | Singer et al. |

FOREIGN PATENT DOCUMENTS

| DE | 42 364 939 A1 | 4/1994 |
| DE | 10051946 A | 10/2000 |
| DE | 100 51 946 A1 | 5/2002 |
| JP | 200128548 A | 5/2000 |
| SU | 545592 | 2/1977 |

\* cited by examiner

*Primary Examiner*—Eric Hug
(74) *Attorney, Agent, or Firm*—Kalow & Springut LLP

(57) ABSTRACT

In some embodiments, the invention provides a refining chamber for glass production, made of platinum group metal materials, with improved refining effectiveness. The refining chamber according has the shape of a tube with a cross section (1), with the cross section of the tube being shaped, in at least one segment, so that in the operating position the length (10) of a horizontal line (12) which divides the surface of the cross section into essentially a lower and an upper segment of the surface, both of which have essentially the same area, is greater than twice the maximum vertical extent (30) of the lower segment of the surface. The cross section of the refining chamber can, for example, have the shape of an oval, an ellipse, a slot, a rounded triangle or a polygon, and the stiffness of the shape of the refining chamber can be increased by forming radially peripheral creases, corners, waves or folds.

10 Claims, 4 Drawing Sheets

REFINING CHAMBER MADE OF PLATINUM GROUP METAL MATERIALS

FIELD OF THE INVENTION

The invention concerns a refining chamber made from platinum group metal materials, particularly a refining chamber which increases the effectiveness of refining in glass production.

BACKGROUND OF THE INVENTION

Plant components and parts of noble metals, preferably platinum group metal (PGM) materials, are used in the glass industry, especially in plants for fusing and hot-molding special glass.

Platinum Group Metal (PGM) materials are distinguished by their high melting points, by high temperature resistance, and also by high mechanical strength and resistance to abrasion. Therefore they are particularly suitable for making structural parts in plants or parts of plants that come into contact with glass melt. Such suitable materials include platinum and alloys of platinum and/or other platinum group metals, which may optionally also contain lesser proportions of base metals as further alloying components, or oxide additives. Typical materials are refined platinum, PtRh 10 (a platinum-rhodium alloy containing 10% rhodium) or platinum that contains a small proportion of finely divided refractory metal oxide, such as zirconium oxide in particular, to increase strength and increase resistance to high-temperature creep ("FKS (fine-grain-stabilized)" platinum). The same or similar materials are also abbreviated as ODS (Oxide Dispersion Strengthened), DPH (DisPersion Hardened) or ZGS (Zirconia Grain Stabilized) materials. DE-A 2002 886 discloses a possible method to manufacture such materials and its contents and is herewith incorporated by reference. Melt technology plant components, such as those described above, are used for melting, refining, transporting, homogenizing, and measuring out molten glass.

Melt technology plant components are usually made essentially of plates of noble metal, often as thin-walled tube systems. Molten glass flows through them at temperatures between 1000° C. and 1700° C. These tube systems are generally surrounded by ceramic, which both insulates and supports them and which, in turn, is often held by supportive metal structures such as metal boxes.

The PGM parts are made at room temperature and installed in the corresponding plants. They are operated at temperatures in the range of about 1000° C. to 1700° C.

One process step in glass melting is "refining." "Refining" involves complete dissolution and homogeneous distribution of all the individual components of glass, particularly the elimination of streaks, and refining, i.e., removal of gas bubbles from the melt. Attaining maximum homogeneity and freedom from bubbles requires thorough mixing and degassing of the glass.

For certain special glasses, optical glasses, or even display glasses, refining is done in a PGM tube with a round cross-section. In operation, the tube lies essentially horizontally. The tube is filled half to two thirds full of glass so as to get the best use of the refining chamber, which is made of very expensive material.

The following points, among others, are critical for refining: (a) the size of the open surface of the glass has a substantial effect on the effectiveness of degassing; (b) the maximum path of the rising gas bubbles affects the time required for refining; (c) the mixing and throughput are determined by the flow profile and the velocity of the glass flow; and (d) the temperature of the glass and the temperature distribution in the glass affect the refining. As the refining is done at the highest temperature in the entire glass fusion process, heat is added directly or indirectly to the refining segment.

There is a need for new and improved solutions for melting and hot forming of glass.

SUMMARY OF THE INVENTION

One aspect of the present invention is to provide new or improved solutions for plant components made of PGM materials for melting and hot forming of glass. The invention is particularly based on the objective of providing an improved refining chamber and a refining process suitable for increasing the effectiveness of refining in glass production.

In one embodiment, the invention comprises a refining chamber made of PGM material for glass production, comprising: a chamber in the shape of a tube having a cross section, wherein the refining chamber comprises at least one segment shaped so that in when the tube is in operating position, a horizontal line, that divides the cross section into an upper section and a lower section is greater than twice the maximum vertical extent of the lower section.

In another embodiment, the invention comprises a process for refining glass in which the molten glass flows through a tubular refining chamber according to the invention, comprising: allowing glass in the molten state at a temperature of 1000° C. to 1700° C. flow through the refining chamber, wherein the cross section of the refining chamber is, in at least one segment, shaped so that in the operating position the length of a horizontal line that divides the surface of the cross section into a lower and an upper section of the surface, both of which have essentially the same area, is greater than twice the maximum vertical extent of the lower segment of the surface, and/or the level of the molten glass is adjusted so that the surface of the glass perpendicular to the direction of flow of the molten glass has a width which is more than twice as great as the maximum vertical extent of the molten glass in the refining chamber.

In another embodiment, the invention comprises a process for producing a refining chamber according to the invention, comprising: (a) inserting a smooth-walled tubular segment having two axial ends into a cylindrical mold having an inside diameter and an outside diameter, wherein the tubular segment has an inside diameter and an outside diameter, and wherein the inside diameter is essentially the same as the outside diameter, and wherein the tubular segment has corrugation-like radial depressions; (b) providing each of the axial ends of the tubular segment with a compression tool that closes the end of the tube tightly, forming a space; (c) filling the space so formed completely with a hydraulic liquid; and (d) generating an internal hydraulic pressure by exerting an axial compression through the compression tools in such a manner that the walls of the tubular segment are corrugated to match the depressions in the mold with simultaneous shortening of the tubular segment.

In another embodiment, the invention comprises using a tube or a process according to the invention to refine glass.

A refining chamber for glass production according to the invention is made of PGM materials, preferably of FKS 16 Pt alloy. The refining chamber can be made in the form of a tube with a cross section which is shaped, in at least one segment, such that in the operating position the length of a horizontal line which divides the surface of the cross section essentially into an upper and a lower section of the surface, both having essentially the same area, is greater than twice the maximum vertical extent of the lower surface section. The ratio of the length of the horizontal line to the maximum vertical extent of the lower surface section is preferably from 2.5:1 to 5:1, especially preferably between 3:1 and 4:1. In one preferred embodiment, the refining chamber according to the invention has the form of an oval, an ellipse, a slot, a rounded triangle, or a polygon, in which case the design can, according to the invention, be stabilized by stiffening measures in the shape, such as by shaping of creases, corners, waves or folds.

More preferably the refining chamber has a wall thickness of approximately 0.5 mm to 3.0 mm and even more preferably of 0.7 mm to 1.5 mm.

Special shaping of the cross section of the refining chamber results in the following differences and advantages as compared with a known refining chamber with circular cross section: (a) the free surface of the glass increases, resulting in better degassing; (b) the longest path from the lowest point at the bottom to the surface decreases, which means that degassing requires less time, with the result that either the throughput increases, the refining segment is shortened, or the cross section can be reduced. That, in turn, results in less PGM materials being tied up in the production plant, so that costs can be reduced substantially; (c) the reduced depth of the glass bath and the altered flow cross section will result in a different flow profile, which again results in better mixing of the glass bath; and (d) as heat is added along the refining segment, a lesser depth of the glass bath further results in decreased temperature differences in the glass, or faster heating of the glass.

In summary, the altered geometry of the cross section of the refining chamber produces better and more effective refining of the glass. A refining process according to the invention has correspondingly been designed according to what has been stated above.

For a better understanding of the present invention together with other and further advantages and embodiments, reference is made to the following description, the scope of which is set forth in the appended claims.

BRIEF DESCRIPTION OF THE DRAWINGS

The preferred embodiments of the invention have been chosen for purposes of illustration and description but are not intended to restrict the scope of the invention in any way. The preferred embodiments of certain aspects of the invention are shown in the accompanying figure, wherein.

DETAILED DESCRIPTION OF THE PREFERRED EMBODIMENTS

Figure 1A:
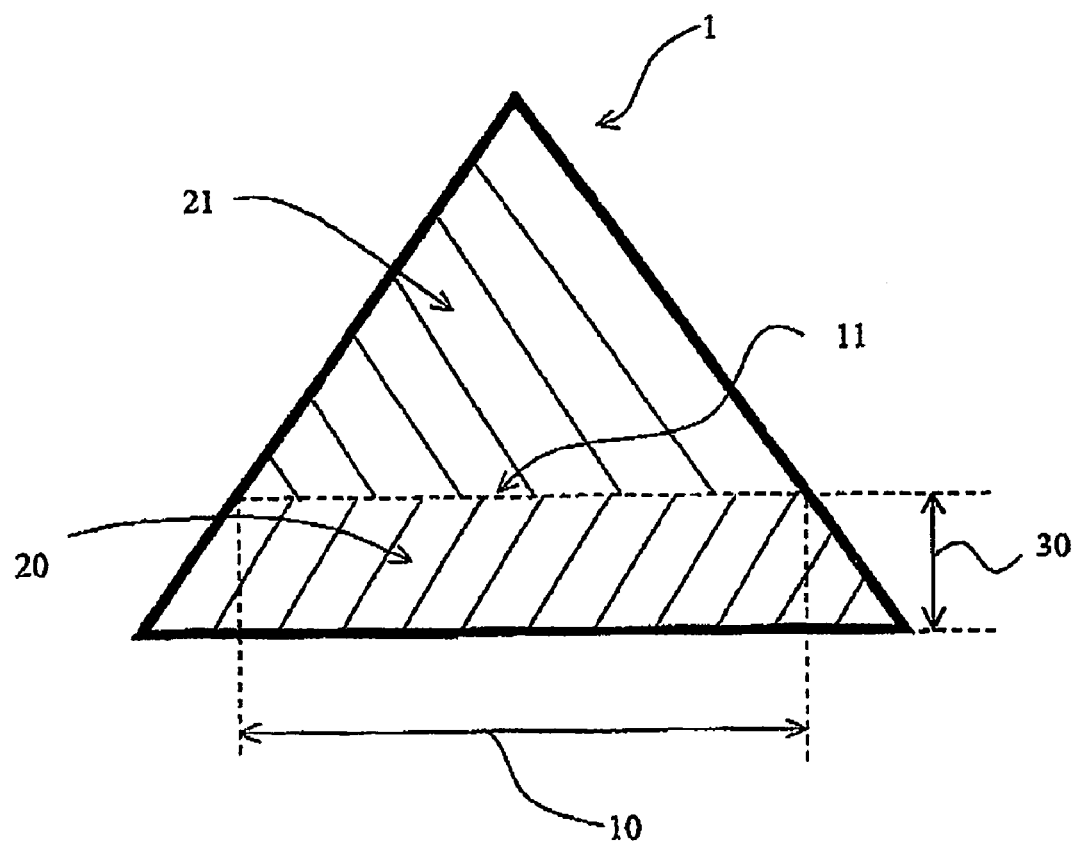
FIGS. 1(a) and (b) each show schematically the cross section of a refining chamber according to the invention in its operating position.

The present invention will now be described in connection with preferred embodiments. These embodiments are presented to aid in an understanding of the present invention and are not intended to, and should not be construed to, limit the invention in any way. All alternatives, modifications and equivalents that may become obvious to those of ordinary skill upon reading the disclosure are included within the scope of the present invention.

This disclosure is not a primer on refining glass; basic concepts known to those skilled in the art have not been set forth in detail.

In one embodiment, the invention comprises a refining chamber made of PGM material for glass production, comprising: a chamber in the shape of a tube having a cross section 1, wherein the refining chamber comprises at least one segment shaped so that in when the tube is in operating position, a horizontal line 11, having a length 10, that divides the cross section into an upper section 21 and a lower 20 section is greater than twice the maximum vertical extent 30 of the lower section 20.

In another embodiment, the refining chamber can be stiffened by shaping measures, said shaping measures comprising forming of creases, corners, waves, folds, or combinations thereof, at the circumference of the refining chamber. This particularly applies when the wall thickness is approximately 0.5 mm to 3 mm and more preferably 0.7 mm to 1.5 mm.

In another embodiment, the refining chamber is configured so that the ratio of the length 10 of the horizontal line 11 to the maximum vertical extent 30 of the lower segment of the surface 20 is between 2.5:1 and 5:1, preferably between 3:1 and 4:1.

In another embodiment, the refining chamber has at least one cross section that exists in the tube that is in the shape of an ellipse.

In another embodiment, the refining chamber has at least one cross section 1 in the tube that is in the shape of an oval, a slot, a rounded triangle, a polygon, or combinations thereof.

In another embodiment, the invention comprises a process for refining glass in which the molten glass flows through a tubular refining chamber according to the invention, comprising: allowing glass in the molten state at a temperature of 1000° C. to 1700° C. flow through the refining chamber, wherein the cross section of the refining chamber is, in at least one segment, shaped so that in the operating position the length 10 of a horizontal line 11 that divides the surface of the cross section into a lower and an upper section of the surface, 20 and 21, respectively, both of which have essentially the same area, is greater than twice the maximum vertical extent 30 of the lower segment of the surface 20, and/or the level of the molten glass is adjusted so that the surface of the glass perpendicular to the direction of flow of the molten glass has a width which is more than twice as great as the maximum vertical extent of the molten glass in the refining chamber.

In another embodiment, the invention comprises a process for producing a refining chamber according to the invention, comprising: (a) inserting a smooth-walled tubular segment having two axial ends into a cylindrical mold having an inside diameter and an outside diameter, wherein the tubular segment has an inside diameter and an outside diameter, and wherein the inside diameter is essentially the same as the outside diameter, and wherein the tubular segment has corrugation-like radial depressions; (b) providing each of the axial ends of the tubular segment with a compression tool that closes the end of the tube tightly, forming a space; (c) filling the space so formed completely with a hydraulic liquid; and (d) generating an internal hydraulic pressure by exerting an axial compression through the compression tools in such a manner that the walls of the tubular segment are corrugated to match the depressions in the mold with simultaneous shortening of the tubular segment.

In another embodiment, the invention comprises using a tube according to the invention to refine glass.

Figure 1B:
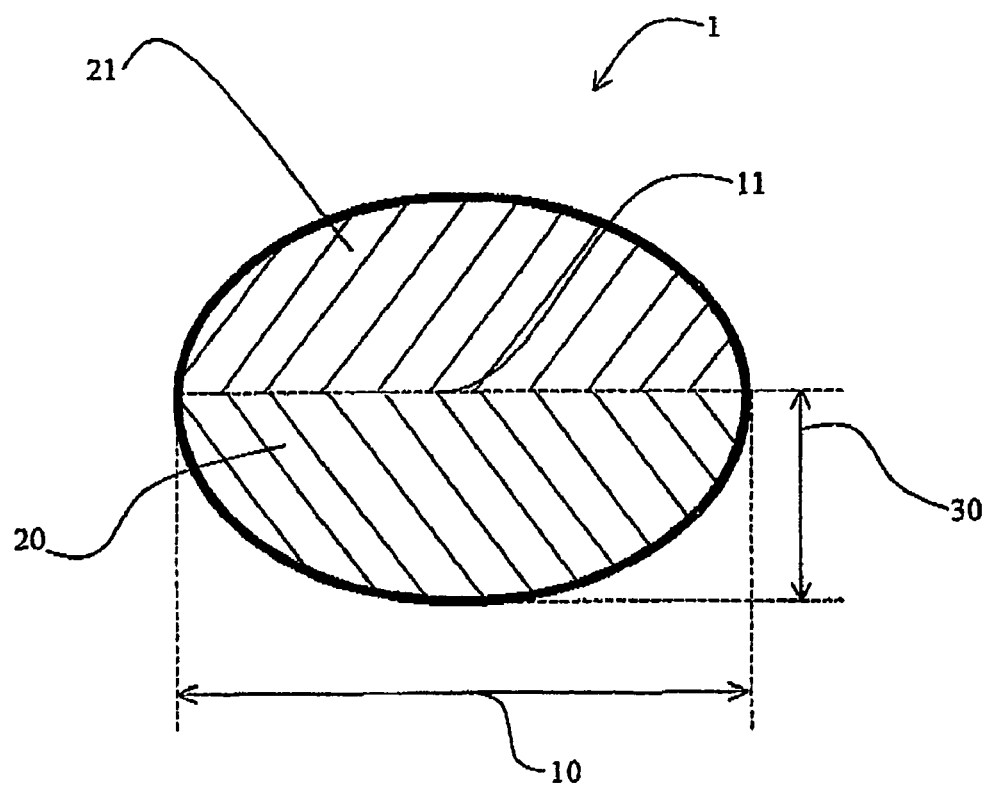

Refining chambers made of PGM materials, with a circular cross section, are known as the state of the art. In a refining chamber according to the present invention, the width of the surface perpendicular to the direction of flow of the glass is more than twice the depth of the glass from the bottom of the refining chamber to the surface. As is shown schematically in FIGS. 1(a) and 1(b), that is achieved according to the invention by the cross section 1 of the refining chamber in the operating position, i.e., in an essentially horizontal position, being shaped so that the length 10 of a horizontal line 11 which divides the area of the cross section essentially into a lower and an upper area section 20 and 21, respectively, so that the two area sections have essentially the same area, is greater than twice the vertical extent 30 of the lower area section 20. The ratio of the length of the horizontal line to the maximum vertical extent is preferably at least 2.5:1. In other words, if the refining chamber is filled with half the maximum possible amount of glass, the maximum height of the glass is less than half the width of the glass surface.

Figure 2:
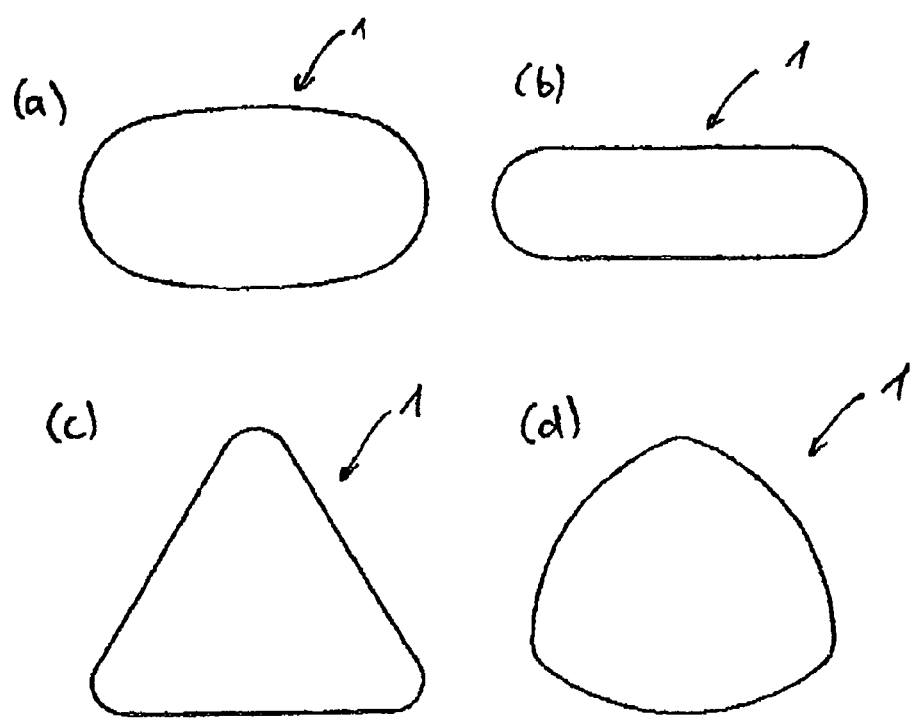
FIGS. 2(a)-(d) show other possible cross section geometries for a refining chamber according to the invention.

FIG. 2 shows examples of other possible cross sections 1 of refining chambers according to the invention: an oval (FIG. 2(a)), a tube with a special cross section ("slot," FIG. 2(b)), a (rounded) triangle (FIG. 2(c)), and a (circular) polygon (FIG. 2(d)).

Figure 3:
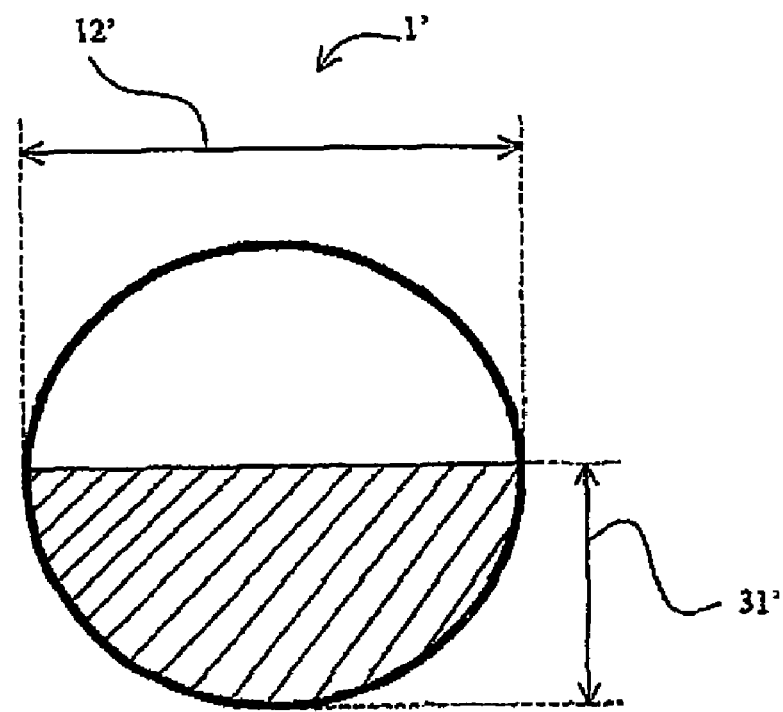
FIG. 3 shows a comparison between a round and an elliptical cross section, each having the same circumference, with the same glass filling.
Figure 3:
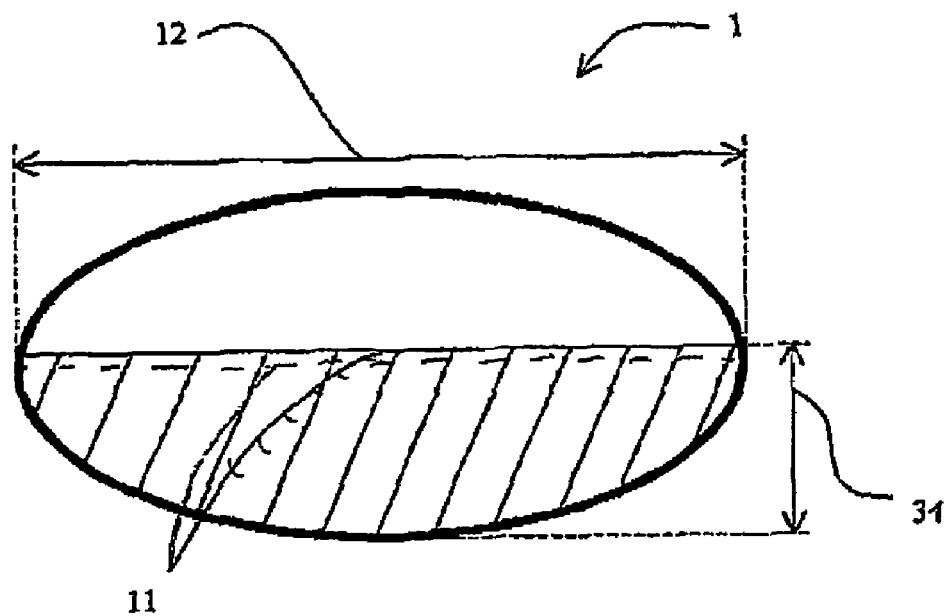

FIG. 3 shows a comparison of a known round cross section 1' with an elliptical cross section 1, in which the ratio between the short and long semiaxis of the ellipse is, for example, 1 to 2. Therefore the relation between the length 10 of the horizontal line 11 and the maximum vertical extent 30, as defined in claim 1, is 4:1. The circumferences of the circle and ellipse are equal to make the amount of material used comparable. When each is filled with the same amount of glass, the following differences appear for this example embodiment: The free surface 12', 12 of the glass increases by 28% over the circular shape, and the maximum path 31', 31 from the lowest point at the bottom to the surface decreases by 34%.

Thin-walled plate structures have very little stiffness, especially at high operating temperatures. To compensate for this disadvantage, it is preferred either increase the thickness of the material, or stabilize the structure by stiffening measures such as shaping of creases, corners, waves or folds.

DE-A-100 51 946 describes a process for producing tubular structural parts from PGM materials through expansion by internal hydraulic pressure. According to the process described there, a tubular structural part of PGM material, with radially protruding corrugations is made by reshaping a smooth-walled tubular segment, by inserting a smooth-walled tubular segment into a cylindrical mold having an inside diameter essentially the same as the outside diameter of the tubular segment, and which has radial corrugation-like depressions, closing the two axial ends with a compression tool, filling the space thus formed completely with a hydraulic liquid, and then, by exerting an axial compression through the compression tools, generating an internal hydraulic pressure so that the walls of the tubular segment are corrugated to match the depressions in the mold with simultaneous shortening of the tubular segment. The information disclosed by DE-A-100 51 946 is hereby incorporated by reference.

This process is suitable for shaping a PGM tube or a PGM tubular segment which then becomes stiffer in the radial direction and more elastic in the axial direction. In particular, this process can be used to provide refining chambers according to the present invention with stiffening shaping measures.

While the invention has been described in connection with specific embodiments thereof, it will be understood that it is capable of further modifications and this application is intended to cover any variations, uses, or adaptations of the invention following, in general, the principles of the invention and including such departure from the present disclosure as come within known or customary practice within the art to which the invention pertains and as may be applied to the essential features hereinbefore set forth and as follows in the scope of the appended claims.

The invention claimed is:

1. A refining chamber made essentially of platinum group metal material for glass production, comprising: a chamber in the shape of a tube having a cross section, wherein the cross section of the refining chamber is, in at least one segment, shaped in the form of an ellipse or an oval so that in the operating position the length of a horizontal line that divides a surface of the cross section into a lower and an upper section of the surface, both of which have essentially the same area, is greater than twice the maximum vertical extent of the lower segment of the surface, wherein the refining chamber has a wall thickness of approximately 0.5 mm to 3 mm and is stiffened by shaping measures, said shaping measures comprising forming of creases, corners, waves, folds, or combinations thereof, at the circumference of the refining chamber.

2. The refining chamber according to claim 1, wherein the ratio of the length of the horizontal line to the maximum vertical extent of the lower segment of the surface is between 2.5:1 and 5:1.

3. The refining chamber according to claim 1, wherein the ratio of the length of the horizontal line to the maximum vertical extent of the lower segment of the surface is between 3:1 and 4:1.

4. The refining chamber according to claim 1, wherein the refining chamber is essentially manufactured from an ODS material.

5. The refining chamber according to claim 1, wherein the refining chamber has a wall thickness of approximately 0.7 mm to 1.5 mm, and is stiffened by shaping measures, said shaping measures comprising forming of creases, corners, waves, folds, or combinations thereof, at the circumference of the refining chamber.

6. The refining chamber according to claim 1, wherein the refining chamber is manufactured from a FKS 16 Pt alloy.

7. A process for refining glass in which the molten glass flows through a tubular refining chamber of claim 1, comprising: allowing glass in the molten state at a temperature of 1000° C. to 1700° C. to flow through the refining chamber, wherein the cross section of the refining chamber is, in at least one segment, shaped in the form of an ellipse or an oval so that in the operating position, the length of a horizontal line that divides the surface of the cross section into a lower and an upper section of the surface, both of which have essentially the same area, is greater than twice the maximum vertical extent of the lower segment of the surface and the level of the molten glass is adjusted in such a way that the surface of the glass perpendicular to the direction of flow of the molten glass has a width which is more than twice as great as the maximum vertical extent of the molten glass in the refining chamber.

8. A process for producing a refining chamber made essentially of a platinum group metal material, the process comprising: inserting a smooth-walled tubular segment into a cylindrical mold having an inside diameter essentially the same as the outside diameter of the tubular segment, and which has radial corrugation-like depressions, closing the two axial ends with a compression tool, filling the space thus formed completely with a hydraulic liquid, and then, by exerting an axial compression through the compression tools, generating an internal hydraulic pressure so that the walls of the tubular segment are corrugated to match the depressions in the mold with simultaneous shortening of the tubular segment, wherein the refining chamber produced comprises a chamber in the shape of a tube having a cross section, wherein the cross section of the refining chamber is, in at least one segment, shaped in the form of an ellipse or an oval so that in the operating position the length of a horizontal line that divides a surface of the cross section into a lower and an upper section of the surface, both of which have essentially the same area, is greater than twice the maximum vertical extent of the lower segment of the surface.

9. A method of using the refining chamber of claim 1 for refining glass, the method comprising (i) providing molten glass and (ii) allowing the molten glass to flow through the refining chamber of claim 1.

10. A process for producing the refining chamber of claim 1, wherein the refining chamber is used for refining glass, the process comprising (i) providing a platinum group material and (ii) forming the refining chamber of claim 1 from the platinum group material so that the refining chamber has a wall thickness of 0.5 mm to 3 mm.

* * * * *